(12) United States Patent
Smith et al.

(10) Patent No.: US 10,274,347 B2
(45) Date of Patent: Apr. 30, 2019

(54) ACOUSTIC DETECTOR

(71) Applicant: Thales Holdings UK Plc, Surrey (GB)

(72) Inventors: Jonathan Neil Smith, Addlestone Nr Weybridge (GB); John Savage, Addlestone Nr Weybridge (GB)

(73) Assignee: THALES HOLDINGS UK PLC, Berkshire (GB)

( * ) Notice: Subject to any disclaimer, the term of this patent is extended or adjusted under 35 U.S.C. 154(b) by 183 days.

(21) Appl. No.: 14/563,325

(22) Filed: Dec. 8, 2014

(65) Prior Publication Data

US 2015/0160047 A1 Jun. 11, 2015

(30) Foreign Application Priority Data

Dec. 10, 2013 (GB) .................................... 1321852.4

(51) Int. Cl.
| | |
|---|---|
| *H04R 1/40* | (2006.01) |
| *H04R 3/00* | (2006.01) |
| *G01D 11/24* | (2006.01) |
| *G01H 17/00* | (2006.01) |

(52) U.S. Cl.
CPC ........... *G01D 11/245* (2013.01); *G01H 17/00* (2013.01); *H04R 1/406* (2013.01); *H04R 3/005* (2013.01)

(58) Field of Classification Search
CPC .... H04R 1/086; H04R 2410/07; H04R 1/406; H04R 3/005; G01D 11/245; G01H 17/00
USPC ............................ 381/71.1, 359, 355; 73/587
See application file for complete search history.

(56) References Cited

U.S. PATENT DOCUMENTS

| | | | | |
|---|---|---|---|---|
| 2,200,097 | A * | 5/1940 | Phelps | H04R 1/086 181/242 |
| 4,065,648 | A | 12/1977 | Cvetko | |
| 4,966,252 | A * | 10/1990 | Drever | H04R 1/086 181/158 |
| 6,651,564 | B1 * | 11/2003 | Tite | C06B 47/00 102/312 |
| 7,248,703 | B1 | 7/2007 | Heine | |
| 7,255,196 | B1 * | 8/2007 | Coney | G01V 1/16 181/108 |
| 9,651,649 | B1 * | 5/2017 | Salloum | G01S 3/802 |
| 2005/0063560 | A1 * | 3/2005 | Soutar | H04R 1/083 381/359 |

(Continued)

FOREIGN PATENT DOCUMENTS

| | | |
|---|---|---|
| GB | 2446620 A * | 8/2008 |
| JP | S55105492 | 8/1980 |
| WO | WO2008/061808 | 5/2008 |

OTHER PUBLICATIONS

Search Report and Written Opinion from United Kingdom Patent Application No. 1321852.4, dated Jul. 25, 2014.

(Continued)

*Primary Examiner* — Helen C Kwok
*Assistant Examiner* — Nashmiya S Fayyaz
(74) *Attorney, Agent, or Firm* — Hauptman Ham, LLP (57) ABSTRACT

An acoustic detector provides a planar arrangement of microphones. A windshield is arranged over the microphones, with a view to reducing the impact of environmental effects. A void is therefore defined over the microphones, and the interior surface of the windshield, which defines the void, is shaped suitably to reduce the potential for acoustic waves propagating within the void to reflect back onto the microphones.

24 Claims, 5 Drawing Sheets

(56) References Cited

U.S. PATENT DOCUMENTS

| | | | |
|---|---|---|---|
| 2005/0163330 A1 | 7/2005 | Beguet | |
| 2005/0169489 A1* | 8/2005 | Cleckler | H04R 1/086 381/113 |
| 2006/0013425 A1* | 1/2006 | Kargus, IV | H04R 1/086 381/359 |
| 2010/0166212 A1* | 7/2010 | Ishibashi | H04R 1/403 381/92 |
| 2012/0183156 A1* | 7/2012 | Schlessinger | H04R 1/083 381/111 |
| 2015/0139444 A1* | 5/2015 | Frazier | H04R 1/406 381/92 |

OTHER PUBLICATIONS

European Search Report from European Patent Application No. 14196945.1, dated Apr. 30, 2015.

* cited by examiner

ACOUSTIC DETECTOR

FIELD

Embodiments described herein concern acoustic detectors.

BACKGROUND

Acoustic detectors are used in a variety of environments. One particular approach is to use an omnidirectional detector, mounted on a pole, which can then be itself attached either to a vehicle or set in the ground, for stability. However, the form factor of most such designs is badly suited to environments where rugged use may be required. Existing technologies have resulted in large and fragile solutions that do not combine sufficient sensitivity and reliability with an acceptable shape.

DETAILED DESCRIPTION OF EMBODIMENTS

Figure 1:
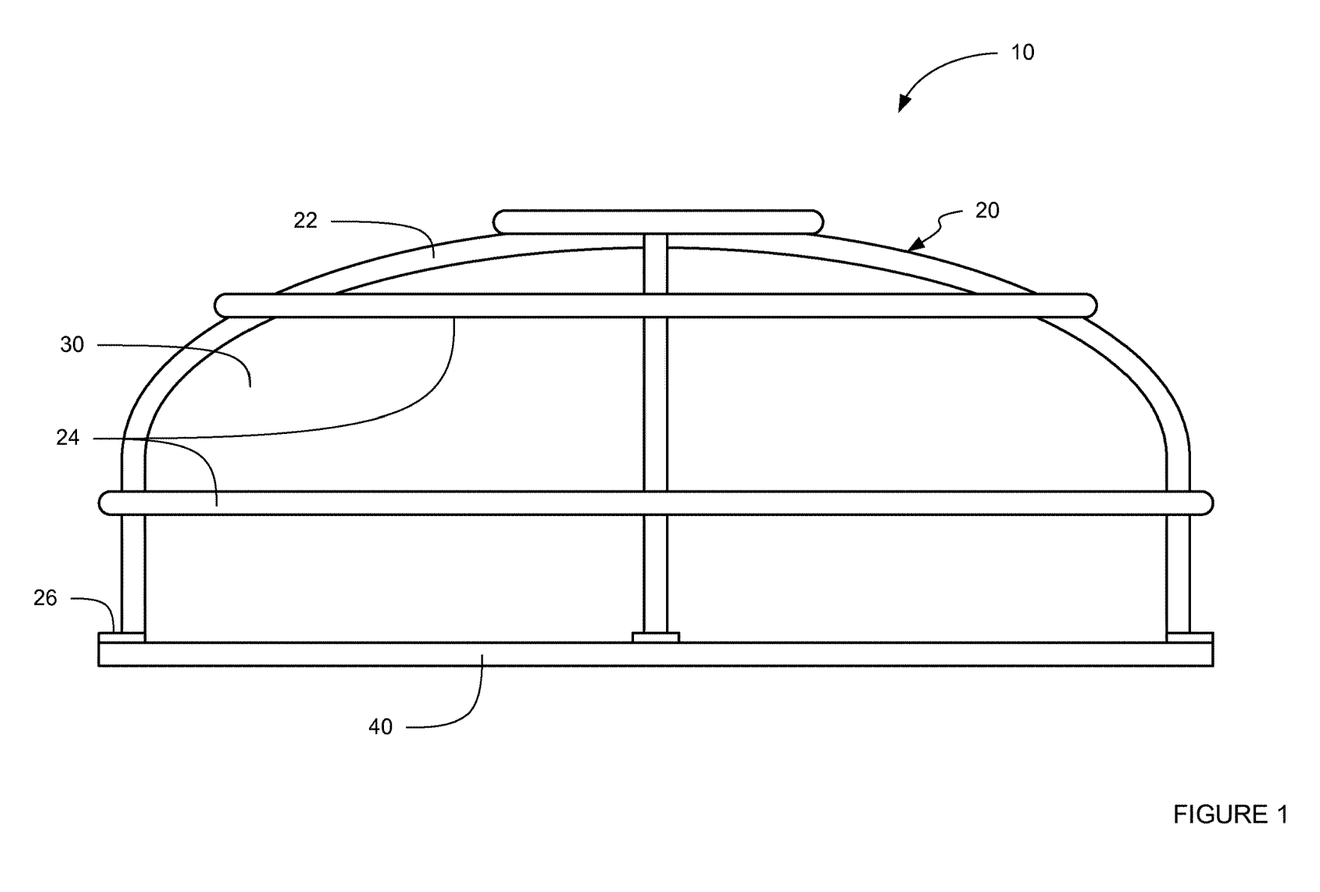
FIG. 1 comprises a side elevation of an acoustic detector in accordance with an embodiment described herein.

An acoustic detector 10 is illustrated in FIG. 1. The components of the detector 10 visible in FIG. 1 will now be described. The detector 10 comprises a protective cage 20, enclosing a windshield 30 of a corresponding shape. The shape of the protective cage 20 is described in detail below. A base plate 40 attaches to four mounting feet 50. The mounting feet 50 can themselves attach to another unit, as required, to provide a stable mounting for the acoustic detector 10.

The protective cage 20, which in this example is constructed of steel wire, defines a generally cylindrical shape, enclosed at one end of the cylinder by a domed end portion. The profile of the domed end portion is, as illustrated, ellipsoidal. The reader will appreciate that other forms of curvature of the domed end portion may be useful, such as paraboloidal, or hemispherical shapes.

Thus, the protective cage 20 comprises radial and annular wires 22, 24. The radial wires 22 define the outline of the domed shape, and cross at a crossing point coincident with the rotational axis of the protective cage 20. The annular wires 24 surround the radial wires 22. At crossing points of the radial and annular wires 22, 24, and at the crossing point of the radial wires 22, wires are welded to provide a sound structure.

The cross-sectional diameter of the wires is selected, along with the steel material, to provide sufficient structural strength for the protective cage 20 dependent on the required application.

The structure and material of the protective cage is merely exemplary, and a suitable component could equally be provided from other materials, such as plastics or ceramics materials.

Figure 3:
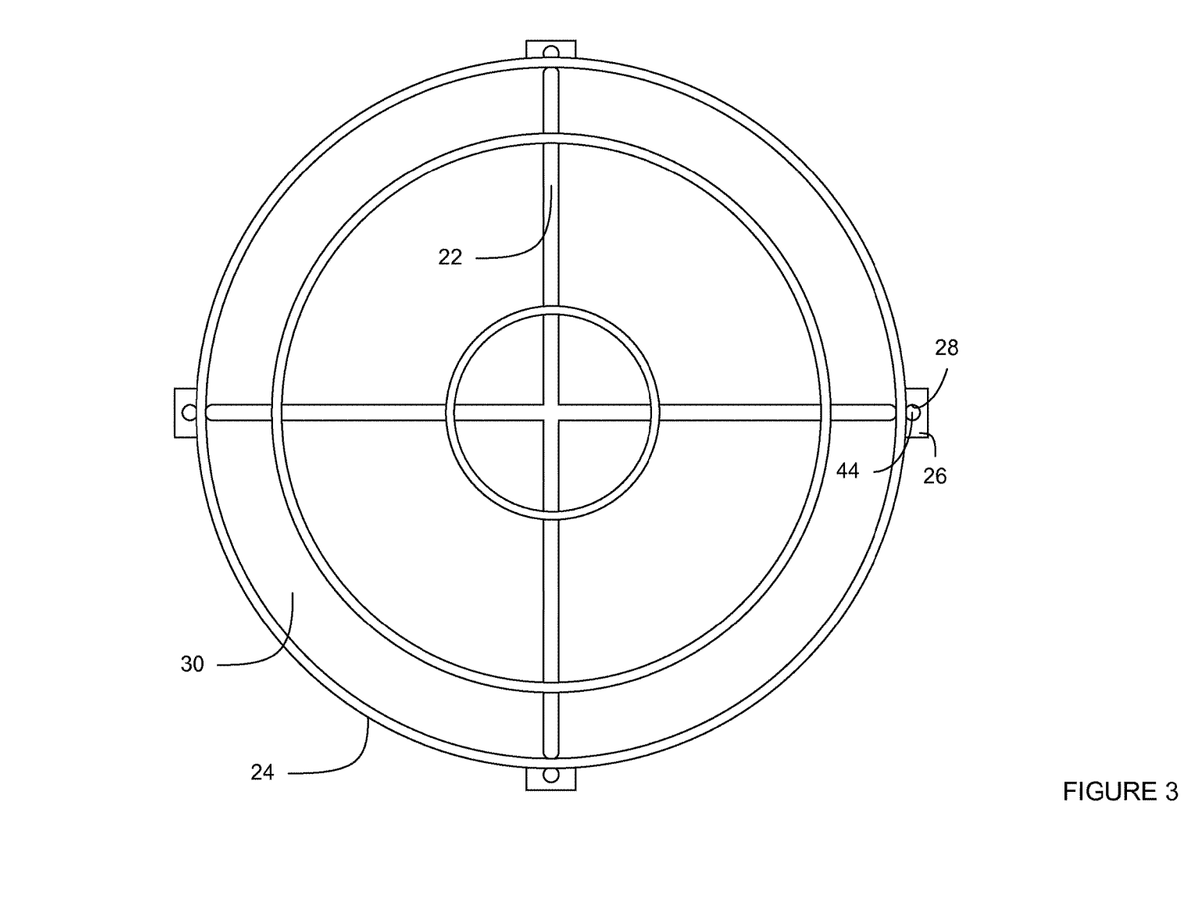

A fixing lug 26 is affixed to the end of each radial wire 22, remote from the aforementioned domed portion. As is illustrated in FIG. 3, each lug 26 comprises a rectangular plate, oriented in a plane perpendicular to the axis of the radial wire 22 to which it is affixed. Each lug 26 defines a circular fixing through-hole 28.

The aforementioned windshield 30, as previously noted, is of a shape which cooperates with the interior space defined by the form of the protective cage 20. The windshield 30 comprises a layer of acoustic foam. The foam of the windshield 30 has acoustic properties such that the windshield 30 allows the transmission of sound, while slowing the velocity of incident wind to zero, without very fast spatial velocity gradients which would generate turbulence and thus noise. Such foams are generally in use and are well known in the field. A typical foam is of an open cell form. The windshield 30 has a substantially consistent thickness throughout its form, thereby defining an interior space which is similar to that defined by the protective cage 20. The thickness of the windshield 30 will depend upon the application to which the acoustic detector 10 is to be put, the acoustic properties of the windshield foam, and any environmental factors to be taken into account. For instance, if it is known that the acoustic detector 10 is to be placed in an environment susceptible to high winds, different design decisions may need to be taken than if the detector 10 is to be used in more benign conditions.

Formation of the shape of the windshield 30 may be achieved either by "sewing" a flat sheet of acoustic foam material into the desired shape or, alternatively, milling the shape from a solid block of the acoustic foam material. The latter may have advantages, in not introducing seams or other imperfections into the windshield 30, which might have an impact on the acoustic properties of the windshield 30. In certain embodiments, the windshield 30 could be moulded into the required shape from, for instance, liquid components. Various techniques now exist to form foam components Additionally, the acoustic foam of the windshield 30 is treated to impart hydrophobic properties. This is achieved by adulterating the acoustic foam with a suitable material. Typically, neoprene can be used for this purpose. As the reader will appreciate, it is important not to impart so much neoprene that the windshield 30 forms an acoustic suspended mass, which would affect the acoustic performance of the detector 10. The exact level of neoprene adulteration to be imparted will depend on the exact design employed, and thus can be determined by experimentation.

Alternative hydrophobic treatments could also be used, such as nano-coatings. Nano-coatings, suitable for acoustic foams, already exist in the market, such as Aridion™ produced by P2i Limited of Abingdon, Oxfordshire, UK.

The interior surface of the windshield 30 is treated further with a waterproofing layer of neoprene. This can be sprayed onto the interior surface to form a thin layer (at least, thin relative to the thickness of the windshield 30 itself), thereby preventing ingress of water, incident on the exterior of the windshield 30, into the interior space defined by the windshield 30. This waterproofing treatment is useful, particularly for implementations of the acoustic detector 10 which are intended for use in environments where precipitation can be expected. Of course, for an acoustic detector 10 only for use in interior situations, or in extremely dry environments, this waterproofing treatment may not be necessary.

Note that the waterproofing treatment of the windshield is advantageously on the interior surface thereof.

Other materials could be used for the windshield 30, such as acoustic fur. Acoustic fur is already used to shield microphones for use in outside broadcasting environments.

The base plate 40 is generally circular, and is dimensioned so as to encompass the four lugs 26 at its circular edge. Four circumferentially spaced and threaded through holes 42, corresponding with the positions of the through-holes 28 allow connection of the cage 20 with the base plate 40, using fixing screws 44.

Figure 2:
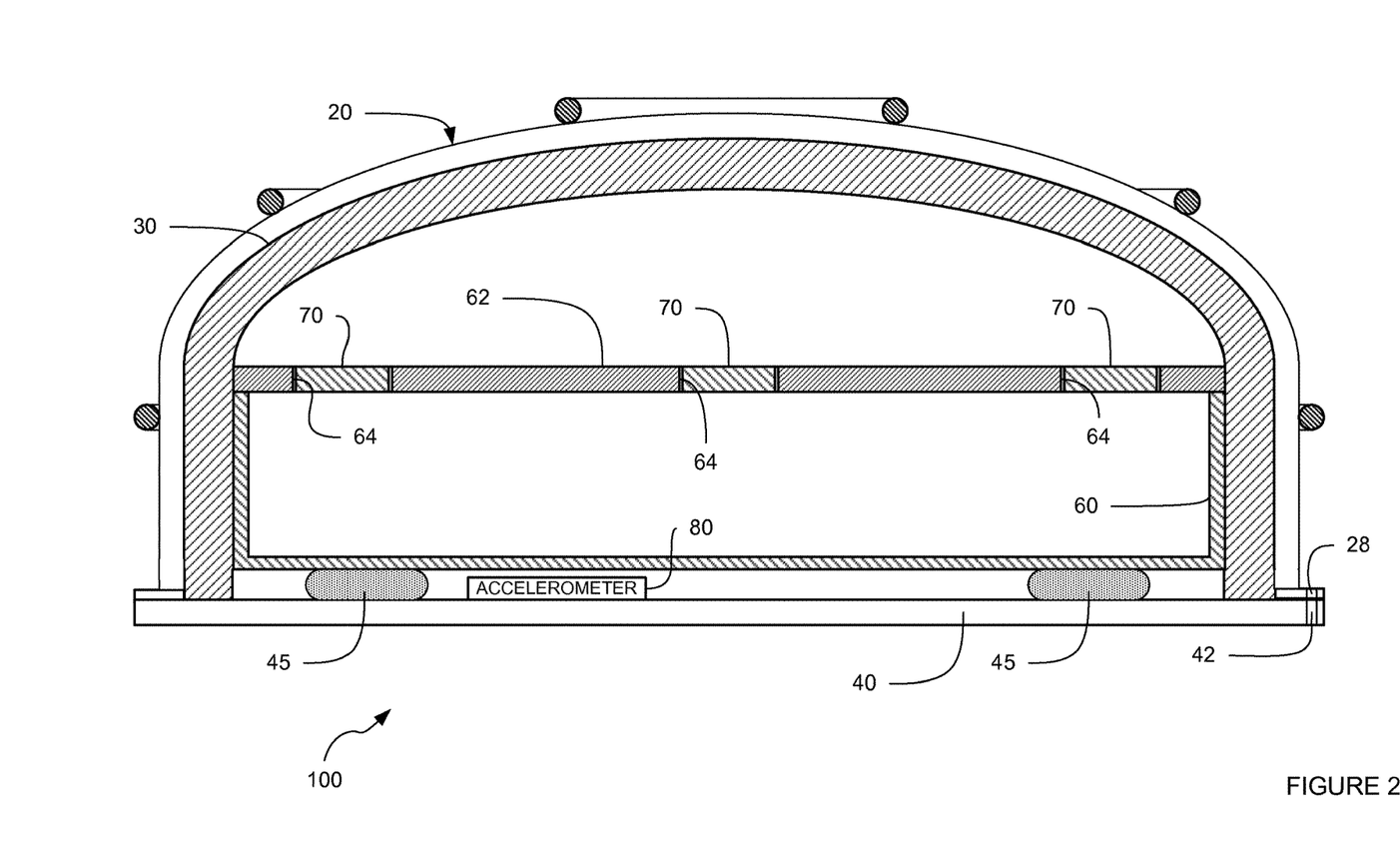
FIG. 2 comprises a cross-sectional view of the acoustic detector illustrated in FIG. 1, FIG. 3 comprises a plan view of the acoustic detector illustrated in FIG. 1.

The mounting feet 50 are affixed to the base plate 40, in a manner to correspond with the positions of the lugs 26. There is no particular significance to this correspondence, and, in other embodiments, the number of mounting feet and the number of lugs need not be equal. The mounting feet 50 are of moulded silicone gel mounts, to act as mounting springs, so as to reduce the possibility of vibration of the acoustic detector 10, with reference to the unit to which it is affixed, having an operational effect on the acoustic detector 10. Through holes 52 are formed in the mounting feet 50, as illustrated in FIG. 2, to enable installation of the device on a platform. For instance, the device could be installed on a motor vehicle, in us, though other installation configurations could readily be contemplated by the reader.

Figure 4:
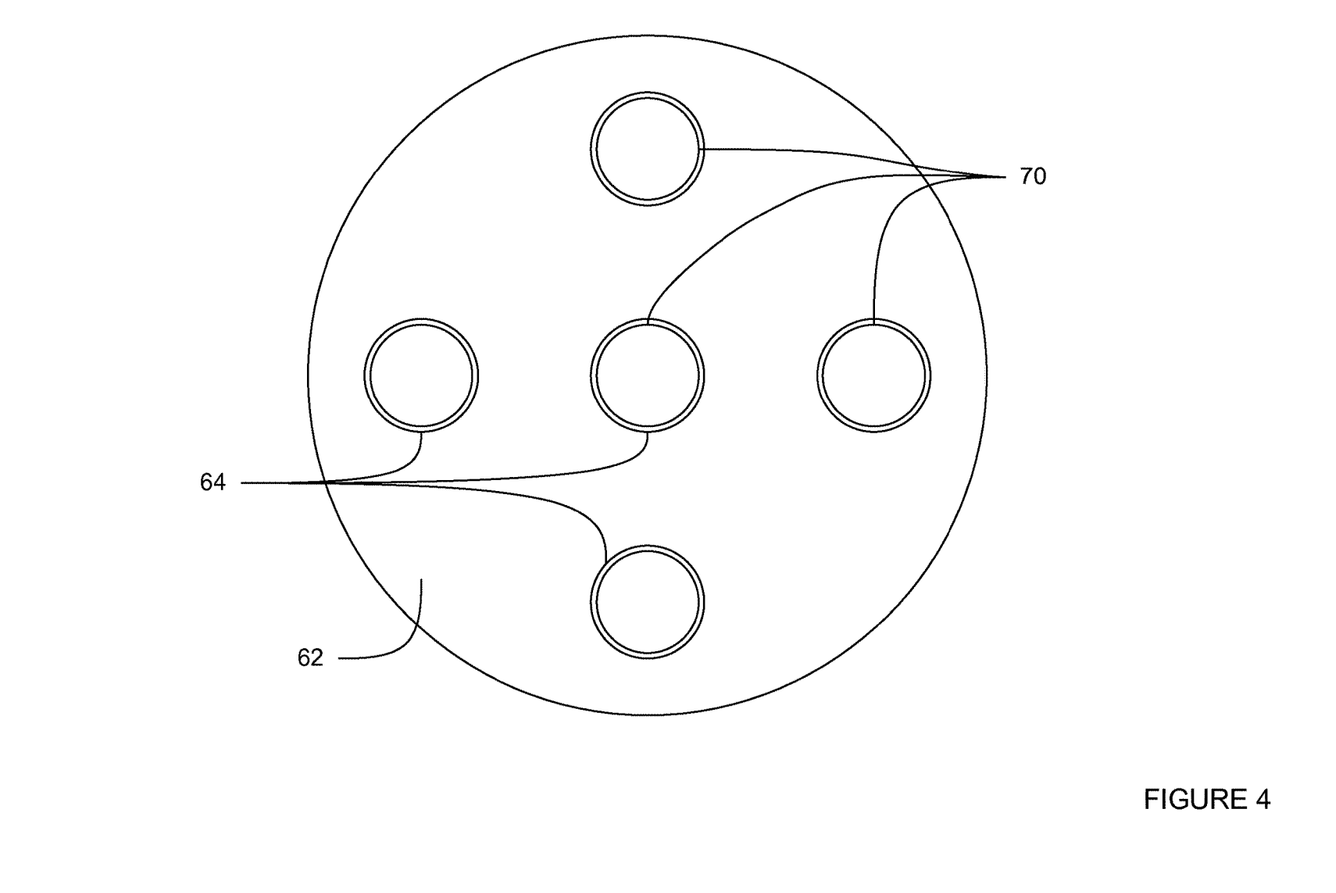
FIG. 4 comprises a plan view of a sensor plate of the acoustic detector illustrated in FIG. 1.

FIG. 2 illustrates the interior construction of the acoustic detector 10, with particular reference to the thickness of the windshield 30 and the space it defines with the base plate 40. The space can be considered to comprises two parts. A cylindrical part of the space is taken up by a sensor enclosure 60, which is itself a cylindrical construction with one closed end. The closed end is substantially adjacent the base plate 40, but spaced therefrom to define a thin cylindrical cavity, within which anti-vibration mountings 45 support the sensor enclosure 60 on the base plate 40. The opposite end of the enclosure 60 is closed by a sensor plate 62. The sensor plate 62 has five through holes 64 defined therein. As further illustrated in FIG. 4, the through holes 64 are arranged in a cruciform formation, centred with the disk. Each through-hole 64 has a microphone 70 mounted therein, oriented towards the domed portion of the interior space of the acoustic detector 10, that is, upwards towards the windshield 30 and the cage 20 as illustrated in FIG. 2.

The anti-vibration mountings 45 are, in this embodiment, made of silicone gel, tuned, together with the mass of the acoustic sensor enclosure 60 to as low a frequency as possible, commensurate with adequate strength to keep the senor enclosure 60 restrained under shocks delivered through any structure or vehicle to which the detector 10 may be attached.

As will be appreciated by the reader, the five microphones 70 are themselves connected to electronic processing components, designed, for a particular application, to detect and process electronic signals arising from acoustic energy incident on the microphones 70. The particular detail of the electronic processing components is not necessary for an understanding of the present embodiment. While the particular electronic processing capabilities of the device is not part of this disclosure, an accelerometer 80 is provided, mounted on the base plate 40. The accelerometer 80 can be used to provide a phase reference for interfering vibrations, permitting their cancellation from acoustic sensor outputs.

It will be appreciated by the reader that various numbers and arrangements of microphones may be used. In most cases, the microphones 70 will be arranged in a coplanar configuration, such as arranged in a circle, concentric circles or as a cruciform pattern. The present embodiment includes five microphones as an example only.

In some cases, a configuration may include at least one microphone positioned out of a plane defined by the other microphones. This may aid in three dimensional wave detection. For instance, the illustrated embodiment could be modified such that one of the illustrated microphones is positioned above the plane of the sensor plate 62.

The shape of the void created between the sensor plate 62 and the windshield 30 has an operational effect on the acoustic detector 10. While various specific profiles may achieve the same, or similar, end results, it is useful here to describe the intended properties to be achieved, so that the skilled reader can select a shape suitable to fit the circumstances of any particular implementation.

The acoustic detector 10 is intended to be used in circumstances presently fulfilled, to an extent, by omnidirectional acoustic detectors. However, it is observed here that the majority of acoustic signals which will be of interest to a user, will emanate from sources roughly at the same altitude as the observation position—i.e. the position of the acoustic detector. Hence, omnidirectionality is not a key requirement for such detectors. The present arrangement, therefore, focuses on effective detection of acoustic waves emanating in directions roughly parallel with ground level.

This working assumption has two main impacts.

Firstly, the general direction of propagation of acoustic waves will be roughly parallel to the sensor plate 62. Secondly, reflected waves will also emanate from the source of any acoustic waves—a particular mode of reflection will be a direct ground reflection between the source and the detector, but other modes may also exist. The time of arrival of these reflected waves at the detector may be a time delay after the arrival of the primary wave, but the time delay may be very short, especially for distant sources close to ground level.

The design of the acoustic detector 10 therefore very much governs how sensitive the detector will be to such acoustic waves, and particularly to reflected acoustic waves. Previous approaches have relied upon omnidirectionality as being a key component of the sensitivity to reflective acoustic waves, but the present device does not enable this approach. Instead, the internal curvature of the windshield 30 plays a key element in this. The dome-shaped interior void provides a reflection profile which is suited to the particular application. Especially, the curvature should be such that reflections from the internal surface of the windshield 30 do not reflect back onto the microphones 70.

Thus, the exact shape of the dome of the windshield 30 (and the consequent shape of other components) will be determined by experimentation. Certain properties have been found to have an ameliorative impact. In particular, it has been found beneficial for the height of the dome (i.e. the distance between the interior surface of the windshield 30 and the closest surface thereto of the sensor plate 62) to be substantially the same as the axis-to-axis distance between microphones 70.

Figure 5:
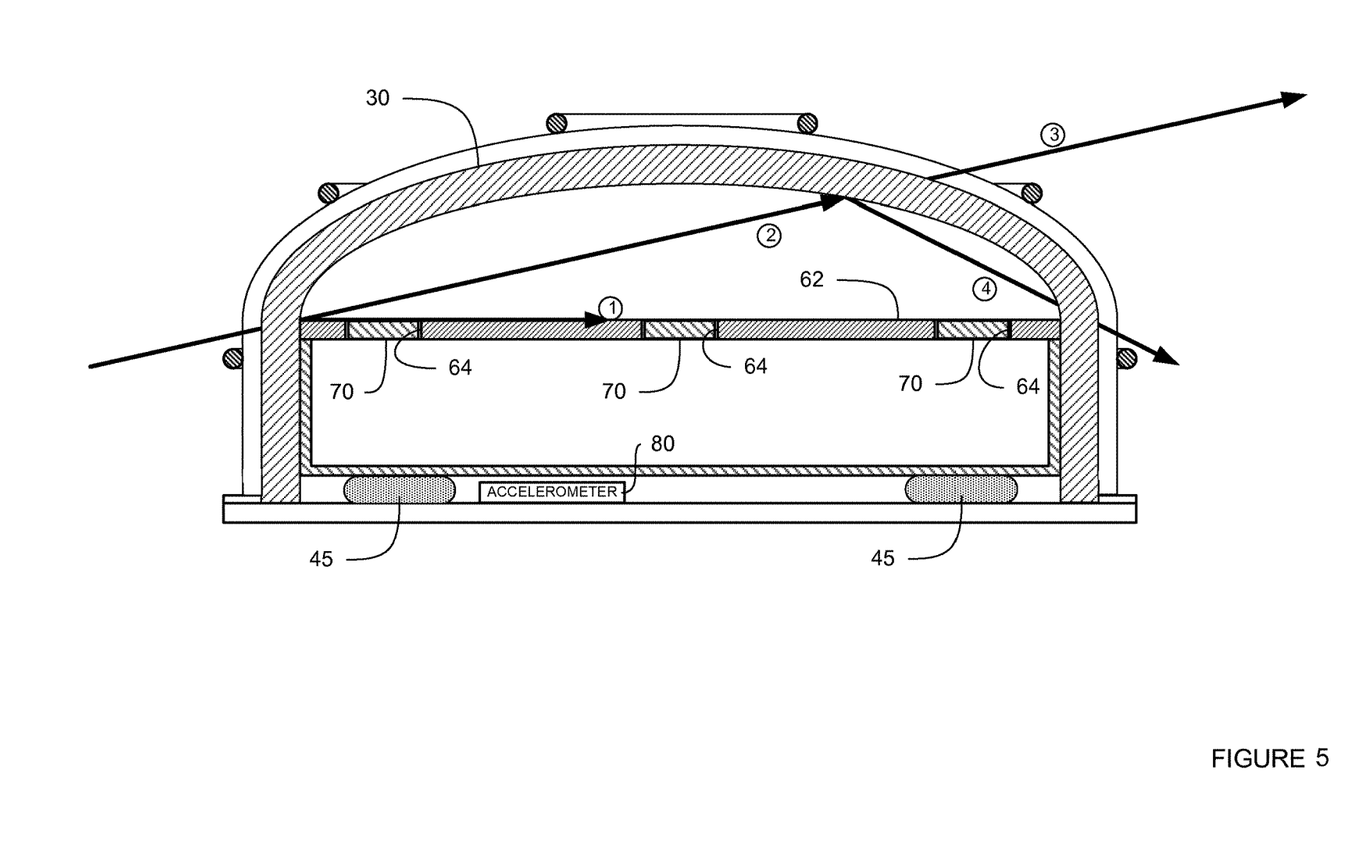
FIG. 5 comprises the cross-sectional view shown in FIG. 2, to demonstrate use of the detector.

The curvature of the dome can be ascertained by application of fundamental theory relating to curved reflectors. In particular, by using a substantially paraboloidal approach (with suitable approximation), the passage of an acoustic wave from beneath the plane of the sensor plate 62 can be managed such that it does not become incident on a microphone. FIG. 5 illustrates this in simple terms.

Such an acoustic wave will propagate through the acoustic detector 10 in several ways. Firstly, a part of the wave will, inevitably, diffract at the edge of the sensor plate 62, and will then propagate substantially in the plane of that sensor plate. This will then be detected at the microphones

70. This is labelled "1" in FIG. 5. Another part of the wave (labelled "2") will continue onwards through the void defined above the sensor plate 62, to the interior surface of the windshield 30. The interior surface of the windshield 30 will cause a further segmentation of the propagation of the acoustic wave. Part of the wave (labelled "3") will, again, propagate directly through the windshield 30 and out of the detector 10. Another part (labelled "4") will be reflected by the internal surface of the windshield 30. This may, in part, be abetted by the neoprene waterproofing coated to the internal surface. However, the curvature of the windshield 30 means that the resultant acoustic reflection will not reflect back onto the microphones 70—it will, instead, reflect down beyond the outer extent of the microphones 70 and out of the detector 10.

Thus, as set out above, the detector 10 offers an opportunity for incident sound waves to be presented cleanly to the microphones 70, in a manner whereby internal reflections within the detector 10 are minimised if not eliminated. Moreover, the spatial properties of an incident sound wave are maintained on entry to the detector, ensuring that the sound waves incident on the microphones are not distorted in time or space. In essence, the detector's acoustic transmissive properties allow its use as if the shielding 30 were not in place, but with the advantageous noise reduction and water resistant properties of the device 10.

As a result, the sound waves are incident on the microphones 70 in a manner such that timing information can be determined from the moment of incidence of a sound wave on each microphone in turn. By this timing information, it can be seen that electrical signals generated at the microphones 70 can be processed straightforwardly to deduce the bearing of an incident sound wave, and thus the origin of the sound emission producing the sound wave.

The exact curvature to be employed, will therefore be subject to design selection. It has been found that a paraboloidal shape is effective, but other shapes may also be effective and so the present disclosure is not limited to that particular shape.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the methods and systems described herein may be made without departing from the sprit of the inventions. The accompanying claims and their equivalents are intended to cover such forms or modifications as would fall within the scope and spirit of the inventions.

The invention claimed is:

1. An acoustic detector comprising:
a sensor plate having a generally planar face in which are mounted a plurality of acoustic sensors,
a supporting cage enclosing the sensor plate and defining a substantially dome shaped interior space within the acoustic detector, and
a windshield enclosing the sensor plate, surrounded by the supporting cage and cooperating with the interior space defined by the supporting cage such that a substantially dome shaped void is formed within the interior space, the substantially dome shape void being defined by an interior surface of the windshield and the sensor plate,
wherein the plurality of acoustic sensors is orientated toward the dome shaped void to measure acoustic signals that travel through the dome shaped void, and wherein the interior surface of the windshield defines a curvature above the sensor plate such that acoustic waves propagating within the dome shaped void do not reflect back onto the plurality of acoustic sensors.

2. The acoustic detector in accordance with claim 1, wherein the cage is substantially acoustically transparent.

3. The acoustic detector in accordance with claim 1, wherein the acoustic sensors are arranged in a coplanar configuration.

4. The acoustic detector in accordance with claim 3, wherein the acoustic sensors are arranged in a rotationally symmetrical configuration.

5. The acoustic detector in accordance with claim 4, wherein the acoustic sensors define a circle.

6. The acoustic detector in accordance with claim 4, wherein the acoustic sensors are arranged in concentric circles.

7. The acoustic detector in accordance with claim 4, wherein the acoustic sensors are arranged in a cruciform configuration.

8. The acoustic detector in accordance with claim 3, further comprising an acoustic sensor not coplanar with the aforementioned acoustic sensors.

9. The acoustic detector in accordance with claim 1, wherein the windshield comprises a generally cylindrical portion encompassing the sensor plate and an enclosing curved portion bounding the void.

10. The acoustic detector in accordance with claim 9, wherein the curved portion is one of substantially ellipsoidal, paraboloidal, or hemispherical in shape.

11. The acoustic detector in accordance with claim 1, wherein the windshield is of an acoustic foam material.

12. The acoustic detector in accordance with claim 11, wherein the acoustic foam material is impregnated with an additive to impart a hygrophobic property to the windshield.

13. The acoustic detector in accordance with claim 12, wherein the additive is neoprene.

14. The acoustic detector in accordance with claim 11, wherein the interior surface of the windshield is coated with a waterproofing layer.

15. The acoustic detector in accordance with claim 1, wherein the windshield is of an acoustic fur material.

16. The acoustic detector in accordance with claim 1, wherein the windshield is constructed of a generally planar sheet material, drawn together and joined to the required form and shape.

17. The acoustic detector in accordance with claim 1, wherein the windshield is formed from a block of material.

18. The acoustic detector in accordance with claim 1, wherein the windshield is formed by moulding.

19. The acoustic detector in accordance with claim 1, wherein the interior surface of the windshield is shaped so as to direct reflections of acoustic waves incident thereon, from within the void, away from the acoustic sensors mounted in the sensor plate.

20. The acoustic detector in accordance with claim 1, further comprising mounting feet for affixing the detector to another device, in use.

21. The acoustic detector in accordance with claim 20, wherein the mounting feet comprise resilient and damping properties such that, when the acoustic detector is affixed to said another device in use, the mounting feet are capable of decoupling vibrations imparted by said another device.

22. The acoustic detector in accordance with claim 1, further comprising a motion detector operable to produce a motion detection signal in response to motion of the detector in use.

23. The acoustic detector in accordance with claim 22, wherein the motion detector comprises an accelerometer.

24. An acoustic detector, comprising:
- a sensor plate having a generally planar face in which are mounted a plurality of acoustic sensors;
- a supporting cage enclosing the sensor plate and defining a substantially dome shaped interior space within the acoustic detector; and
- a windshield enclosing the sensor plate, surrounded by the supporting cage, and cooperating with the interior space defined by the supporting cage such that a substantially dome shaped void is defined by an interior surface of the windshield and the sensor plate, wherein
- the plurality of acoustic sensors is orientated toward the dome shaped void to measure acoustic signals that travel through the dome shaped void,
- the plurality of acoustic sensors has surfaces facing toward the dome shaped void,
- the surfaces of the plurality of acoustic sensors are coplanar with the planar face of the sensor plate, and
- the interior surface of the windshield defines a curvature above the sensor plate such that acoustic waves propagating within the dome shaped void do not reflect back onto the plurality of acoustic sensors.

\* \* \* \* \*